US006184881B1

(12) United States Patent
Medl

(10) Patent No.: US 6,184,881 B1
(45) Date of Patent: *Feb. 6, 2001

(54) COLOR AND SYMBOL CODED VISUAL CUES FOR RELATING SCREEN MENU TO EXECUTED PROCESS

(75) Inventor: Robert E. Medl, San Jose, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/954,852

(22) Filed: Oct. 21, 1997

(51) Int. Cl.[7] .................................................. G06F 3/00
(52) U.S. Cl. ......................... 345/339; 345/349; 345/968
(58) Field of Search ................................. 345/334, 335, 345/345, 348, 349, 351, 339

(56) References Cited

U.S. PATENT DOCUMENTS 5,524,195 * 6/1996 Clanton, III et al. .
5,644,334 * 7/1997 Jone et al. .
5,767,855 * 6/1998 Bardon et al. ........................ 345/355
5,877,766 * 3/1999 Bates et al. ........................... 345/357

OTHER PUBLICATIONS

Microsoft Front Page, Rondall et al, Que Publishing p. 12, 22–23, 32–43, 1996.*

* cited by examiner

Primary Examiner—Raymond J. Bayerl
Assistant Examiner—Cao H. Nguyen
(74) Attorney, Agent, or Firm—Lacasse & Associates; Randy W. Lacasse; Ingrid M. Foerster, Esq.

(57) ABSTRACT

The present invention provides a color background for an icon. As a user traverses related objects the color background is persistent throughout each of the related objects. In addition, iconic symbols present in the original icon will be retained through various stages of related object development. A graphical icon is also added to the related object which conveys the present status of a processing sequence. In Data Mining sequences a series of object development panels are created. Within panels of this series are the corresponding icon background colors, iconic symbols and a graphical icon. The specific graphical icon starts as a representation of a rough stone and ends as a polished diamond. The rough stone representing the starting point in the series and the polished diamond, the ending or completion of the series.

17 Claims, 2 Drawing Sheets

COLOR AND SYMBOL CODED VISUAL CUES FOR RELATING SCREEN MENU TO EXECUTED PROCESS

RELATED MATERIALS

This application is related to the following commonly owned co-pending application which is hereby incorporated by reference:

GUI GUIDE FOR DATA MINING U.S. Ser. No. 08/955,402, filed Oct. 21, 1997.

BACKGROUND OF THE INVENTION

1. Field of Invention

The present invention relates generally to the field of graphical icons. More specifically, the present invention relates to using color, coding and status related icons to provide additional visual indicators to the user.

2. Discussion of Prior Art

The prior art is replete with examples of using icons in various schemes to present visual information related to a particular object. Many applications contain visual indicators that relate icons for existing objects of a particular type to an icon for creating new objects of that type. One known method is to superimpose the image of a star on the upper left-hand corner of an "existing" icon. For example, the icon for a document in Lotus WordPro® 96 is a blank page with the upper right-hand corner turned down, while the icon for a new document is the same but with a star in the upper left-hand corner. This metaphor is not carried any firther than this, however; specifically, it is not carried into user assistance programs, e.g. wizards. In known user assistance programs, icons are used to indicate the start and finish of a user assistance program. For instance, a green "start" auto racing flag and a black and white checkered "finish" auto racing flag reflect the beginning and end of a program or series of program steps respectively, but the flag icon does not relate in any way to the icon for a specific data or file object. What the prior art has failed to teach is a method of using persistent color, encoding and status themes throughout the development of an object of similar type.

Whatever the precise merits, features and advantages of the above cited references, none of them achieves or fulfills the purposes of the present invention. Accordingly, it is an object of the present invention to provide for the use of persistent background color schemes for iconic symbols and corresponding related objects.

It is an additional object of the present invention to use the persistent color schemes throughout the development of an object of similar type.

It is an additional object of the present invention to use persistent symbols for icons representing objects, as well as related object types.

It is further an object of the present invention to provide symbol coded visual cues to provide status or progress information.

These and other objects are achieved by the detailed description that follows.

SUMMARY OF THE INVENTION

The present invention provides an initial color background for an icon. As a user traverses related objects of similar type the color background is persistent throughout each of the related objects. In addition, iconic symbols present in the original icon will be retained throughout various stages of related object development. To provide relative status information, a graphical icon is also added to the related object which conveys the present status of a processing sequence. In the preferred embodiment, a graphical icon for the Intelligent Miner Graphical Interface (co-pending application entitled, GUI Smart Guide for Data Mining) sequences through a series of object development panels. Within each panel in the series are the corresponding icon background colors, iconic symbols and status indicating graphical icons. The specific status indicating graphical icons of the preferred embodiment starts as a representation of a rough stone and end as a polished diamond. The rough stone represents the starting point in the series and the polished diamond, the ending or completion of the series.

The present invention relates to the relationship between icons for the following items: (1) an object of a given type, (2) a new object of a give type, (3) a Smartguide's Start panel (GUI SMART GUIDE FOR DATA MINING)for an object of a given type and (4) the Smartguide's Summary panel (GUI SMART GUIDE FOR DATA MINING) for an object of a given type. Specifically, the rules are as follows:

1. Each object type's icon has a unique foreground image on a unique background color.
2. The icon which indicates the "new" object of any give type is the icon for the object of that type with a star superimposed on that icon; the foreground image and background color are the same as that for the existing object of that type.
3. The icon for the Start panel of the object's Smartguide is an enlarged, 3-D version of the icon representing an existing object of that type with the image of a rough stone superimposed below and to the right of the enlarged image; the foreground image and background color are the same as that for the existing object of that type.
4. The icon for the Summary panel of the object's Smartguide is an enlarged, 3-D version of the icon representing an existing object of that type with the image of a diamond superimposed below and to the right of the enlarged image; the foreground image and background color are the same as that for the existing object of that type.

The present invention improves on the prior art and eliminates many problems associated with the prior art including, but not limited to, those previously discussed above.

DESCRIPTION OF THE PREFERRED EMBODIMENTS

Figure 1:
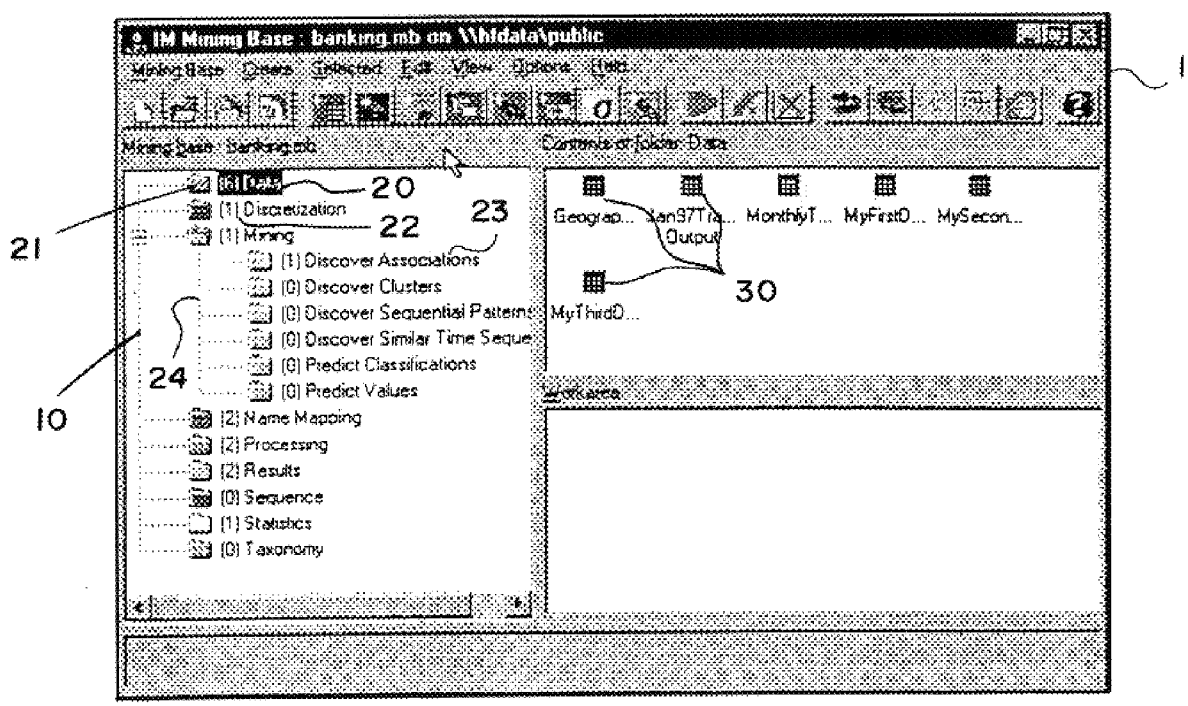
FIG. 1 illustrates an icon and related object with persistent color designations.

While this invention is illustrated and described in a preferred embodiment, the device may be produced in many different configurations, forms and materials. There is depicted in the drawings, and will herein be described in detail, a preferred embodiment of the invention, with the understandin that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

FIG. 1 illustrates a GUI main menu window 1 as fully described in co-pending application entitled, GUI Smart Guide for Data Mining. Of interest within this window is a tree breakout 10 of various objects 20. The tree styled display of objects is very common and is not unlike that found in Windows®95 Explorer system. Each object 20 includes a first folder 21, numeric indicator of the number of sub-objects 22 and the name given to the particular object. Objects are typically directory or file names, but are not limited thereto. In the preferred embodiment, the names 20 represent data mining objects used to develop a data mining profile. In existing systems, the relationships between objects 20 and sub-objects 23 are noted visually by dotted lines 24. In the present invention, specific sub-objects of a similar type 30, i.e., located within the hierarchy of object 20, are given background colors matching colors given to the folder (icon) 21. It is this retention of persistent coloring that provides a user immediate recognition of related files of similar type. The color tracking function enables low level following of related objects without an understanding of the exact underlying connections and hierarchy.

Figure 2:
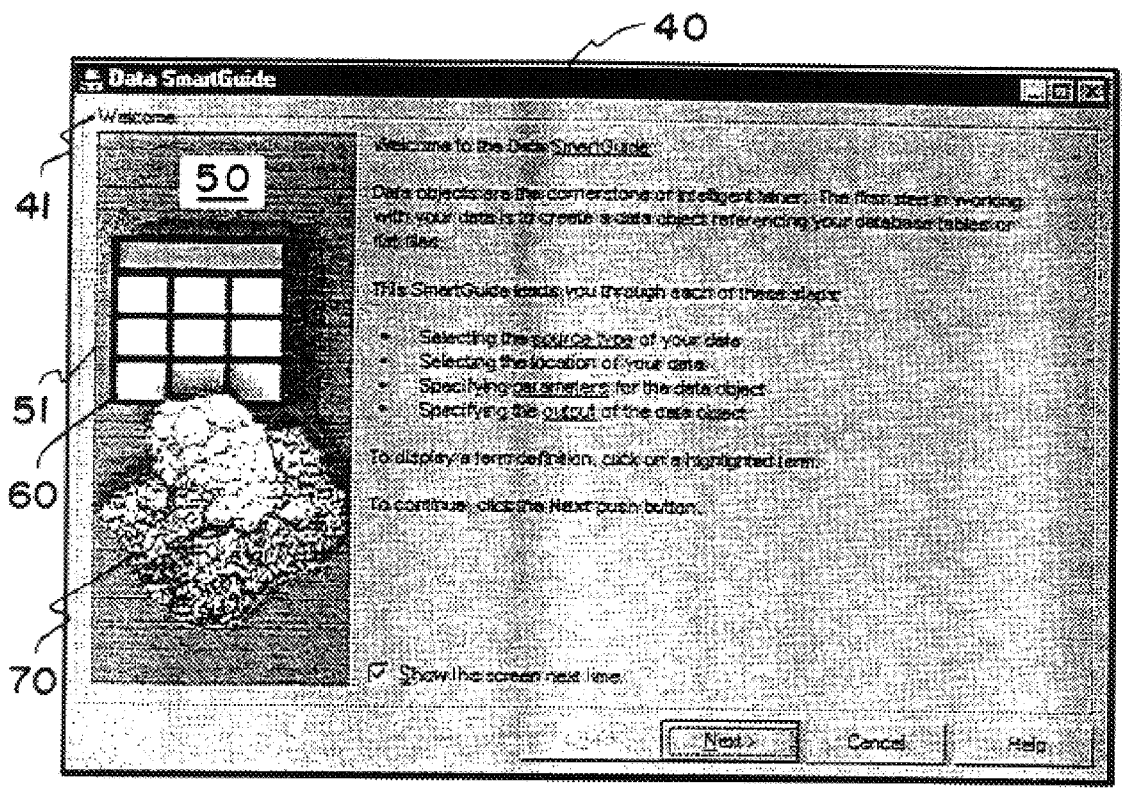
FIG. 2 illustrates an Intelligent Data Mining GUI with color, symbol and iconic progression indicator.

FIG. 2 illustrates a data Smartguide 40 as fully described in co-pending application entitled, GUI Smart Guide for Data Mining. The Smartguide illustrated enables development of a data object similar to those noted above as element 30 in FIG. 1. Of interest in this GUI template is the incorporation of the background color 50 within visible object space 51. Visible object space represents an enlarged 3-D depiction of the icon 30 including its original background color 50 (same as folder 21) and iconic symbol 60. In addition to the previously noted retained elements, is the inclusion of graphical icon 70. In the preferred embodiment Data Mining, the icon is a rough stone or rock (e.g. lump of coal). This icon represents a starting point in a series of templates.

Figure 3:
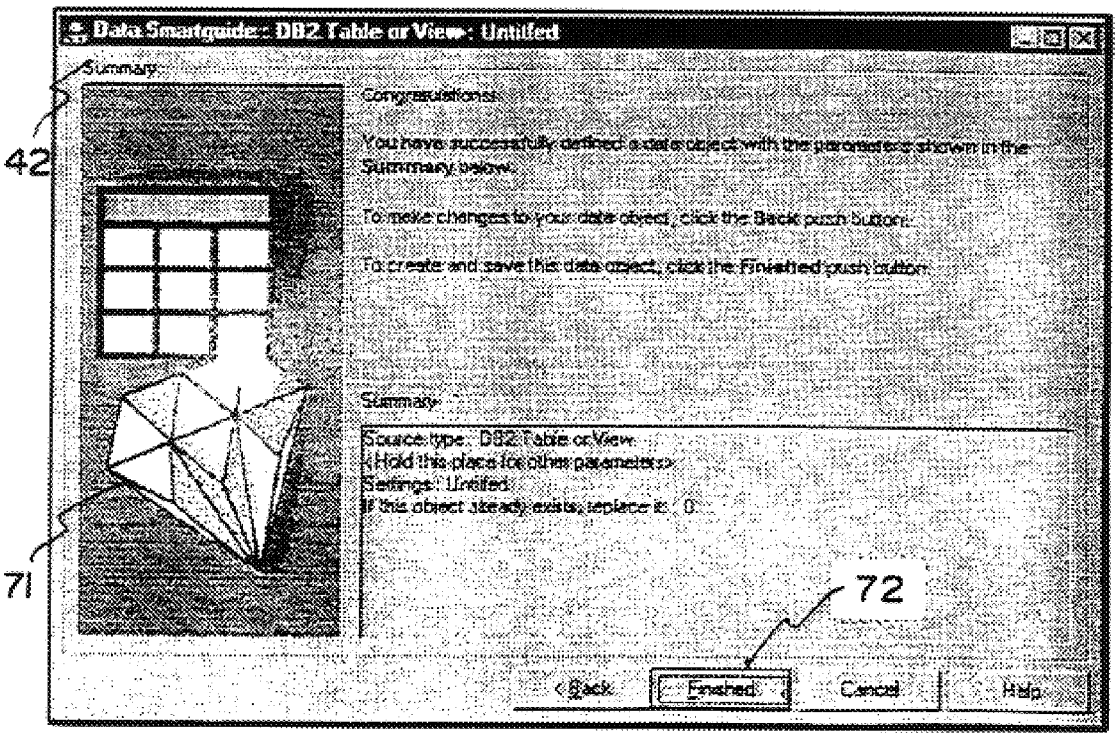
FIG. 3 illustrates the progression of the iconic progression through completion.

The first of these templates is noted by the "welcome" text 41. As execution of the development process progresses, the rough stone 70 transforms into a diamond 71, as shown in FIG. 3. In the preferred embodiment, only the first and last stages of the series of templates illustrate the rough stone and diamond respectively. However, it is envisioned to correlate the development process to any number of graphical iterations of the various stages of transformation from stone to diamond, or equivalents thereof. This Smartguide GUI template represents the completion of the data object development as noted by the "summary" text 42. Upon completion, the user would select the "finish" button 72 thereby naming the developed data object. This data object would then be grouped with the other similar type icons 30, as shown in FIG. 1, retaining both its original background color and icon symbol.

The above enhancements for icons and its described functional elements are implemented in various computing environments. For example, the present invention may be implemented on a conventional IBM PC or equivalent, multi-nodal system (e.g. LAN) or networking system. All programming, mining algorithms, GUIs, display panels and dialog box templates, metadata and data related thereto are stored in computer memory, static or dynamic, and may be retrieved by the user of the Intelligent Mining system in any of: conventional computer storage, display (i.e. CRT) and/or hardcopy (i.e. printed) formats. The programming of the present invention may be implemented by one of skill in the art of object-oriented programming.

CONCLUSION

A system and method has been shown in the above embodiments for the effective implementation of a color and symbol coded visual cue for relating screen icons to executed process icons. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware and specific iconic color or symbol schemes. In addition, the specific chosen icons are representative of the preferred embodiment and should not limit the scope of the invention.

What is claimed is:

1. A computer-based method of delineating lineage between an iconic symbol and a related object, said method using color and symbol coded visual cues to relate a screen menu iconic symbol to an executed process, said related object created be a series of related graphical templates used in the development of said related object and comprising:

selecting a screen menu icon representing a first object of a specified file type;

designating a background color for said icon;

creating a graphical image to be included during said development of said related object of the same file type and related to said first object, said graphical image encapsulated within said series of related graphical templates;

retaining said background color and a representation of said first icon within said graphical image;

traversing said series of related graphical templates which include said graphical image, and wherein said related object and series of related graphical templates are recognizable as related to said first object by the persistence of said background color and said representation of said first icon.

2. A computer-based method of delineating lineage between an iconic symbol and a related object as per claim 1, wherein said representation of said first icon comprises an enlarged graphical image representation of said first icon and associated background color.

3. A computer-based method of delineating lineage between an iconic symbol and a related object as per claim 1, wherein said graphical image of said related object further comprises a graphical progression indicator within a visible portion thereof.

4. A computer-based method of delineating lineage between an iconic symbol and a related object as per claim 3, wherein said graphical progression indicator comprises displaying a plurality of related graphical images representing various stages of completion.

5. A computer-based method of delineating lineage between an iconic symbol and a related object as per claim 4, wherein said plurality of graphical images comprise at least a rough stone and diamond.

6. A computer-based method of delineating lineage between an iconic symbol and a related object as per claim 1, wherein said series of related graphical templates assist a user in developing mining objects.

7. A computer-based method of delineating lineage between an iconic symbol and a related object as per claim 1, wherein said graphical image of said related object displays an enlarged 3-d version of said icon referencing said first object.

8. A computer-based method of delineating lineage between an iconic symbol and a related object, said iconic symbol comprising one of a plurality of data mining icons of a specified type and said related object developed by a sequence of templates used in the development of a data mining object of said specified type comprising:

creating an icon representing a first data mining object of a specified type;

designating at least a background color and one or more graphical notation(s) for said icon;

creating a graphical image to be included during said development of said related data mining object of the same file type and related to said first object;

said graphical image encapsulated within said sequence of templates and further comprising: retaining said background color and said graphical notation(s) of said first icon within said graphical image of said related data mining object, and wherein said second data mining object is recognizable as related to said first object by the persistence of said background color and said graphical notation(s).

9. A computer-based method of graphically illustrating a progressive relationship between an iconic symbol and a related object, said iconic symbol comprising one of a plurality of icons of a specified type and said related object created by a sequence of templates used in its development comprising:

selecting a first icon for an object of a specified type;

designating at least a background color and one or more graphical notation(s) for said icon;

creating a graphical window to be included during said development of said related object, said graphical window encapsulated within said sequence of templates and further comprising: retaining said background color and said graphical notation(s) of said first icon within said graphical window;

superimposing one or more graphical images onto said graphical window;

modifying said one or more graphical images to reflect an evolution of progression of development of said related object, and wherein said progression comprises a plurality of related graphical images in various stages of completion.

10. A computer-based method of graphically illustrating a progressive relationship between an iconic symbol and a related object as per claim 9, wherein said sequence of templates assist a user in developing data mining objects.

11. A computer-based method of graphically illustrating a progressive relationship between an iconic symbol and a related object as per claim 7, wherein said plurality of related graphical images comprise at least a rough stone and diamond.

12. A computer program product for use with a graphics display device, said computer program product comprising:

a computer usable medium having computer readable program code means included in said medium:

said computer readable program code means embodying a method for using color and symbol visual cues to relate a screen menu iconic symbol to an executed process and comprising:

selecting a screen menu icon representing a first object of a specified file type;

designating a background color for said icon;

creating a graphical image included during development of a related object said graphical image encapsulated within a series of related graphical templates;

retaining said background color and a representation of said icon of said first object within said graphical image, and wherein said second object is recognizable as related to said first object by the persistence of said background color and representation of said icon.

13. A computer program product for use with a graphics display device as per claim 12, wherein said series of related graphical templates assist a user in developing mining objects.

14. A computer program product for use with a graphics display device, said computer program product comprising:

a computer usable medium having computer readable program code means included in said medium:

said computer readable program code means embodying a method for using color and symbol visual cues to relate a screen menu iconic symbol to an executed process and comprising:

selecting an icon representing a first object of a specified file type;

designating at least a background color and one or more graphical notation(s) for said icon;

creating a graphical image included during development of a second object of the same file type and related to said first object, said graphical image representation encapsulated within a GUI of said executed process;

retaining said background color and said graphical notation(s) of said first object within the graphical image of said second related object, and wherein said second object is recognizable as related to said first object by the persistence of background color and graphical notation(s).

15. A computer program product for use with a graphics display device as per claim 14, wherein said persistence of color and graphical notation(s) between said first and second objects provides user assistance when traversing a series of graphical templates within said graphical user interface.

16. A computer program product for use with a graphics display device as per claim 14, wherein said graphical user interface assists a user in developing mining objects.

17. A computer program product for use with a graphics display device, said computer program product comprising:

a computer usable medium having computer readable program code means included in said medium:

said computer readable program code means embodying a method for using color and symbol visual cues to relate a screen menu iconic symbol to an executed process and comprising:

creating a first icon for an object;

designating at least a background color and one or more graphical notation(s) for said icon:

creating a graphical window during development of a related object, including said background color and one or more graphical notations) in said window;

further superimposing one or more graphical images onto said graphical window modifying said one or more graphical images to reflect an evolution of progression of development of said related object, said related object developed using a series of templates retaining said graphical window, and wherein said progression comprises a plurality of related graphical images in various stages of completion.

* * * * *

UNITED STATES PATENT AND TRADEMARK OFFICE
CERTIFICATE OF CORRECTION

PATENT NO. : 6,184,881 B1
DATED : February 6, 2001
INVENTOR(S) : Robert E. Medl

It is certified that error appears in the above-identified patent and that said Letters Patent is hereby corrected as shown below:

Column 1,
Line 65, after "type" insert -- , --.

Column 2,
Line 17, change "give" to -- given --.
Line 18, change "(GUI SMART GUIDE FOR DATA, MINING)for" to -- (GUI SMART GUIDE FOR DATA MINING) for --.
Line 24, change "give" to -- given --.
Line 64, change "understandin" to -- understanding --.

Column 5,
Line 51, delete "7" insert therefore -- 9 --.

Column 6,
Line 54, change "object,including" to -- object, including --.

Signed and Sealed this

Thirtieth Day of October, 2001

*Attest:*

*Attesting Officer*

NICHOLAS P. GODICI
*Acting Director of the United States Patent and Trademark Office*